Jan. 19, 1937. F. G. THWAITS 2,067,994
TANK STRUCTURE
Filed May 31, 1934
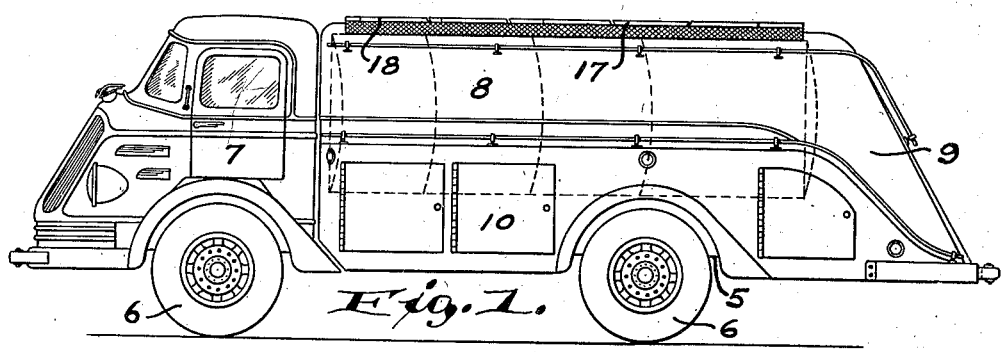
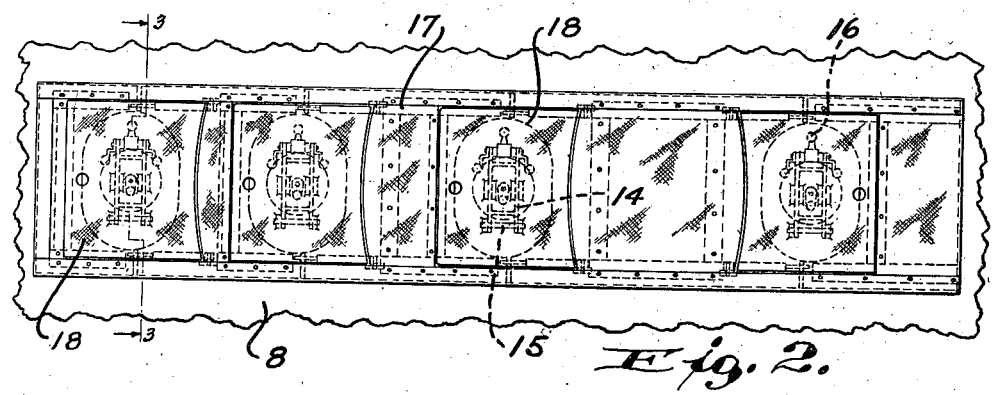
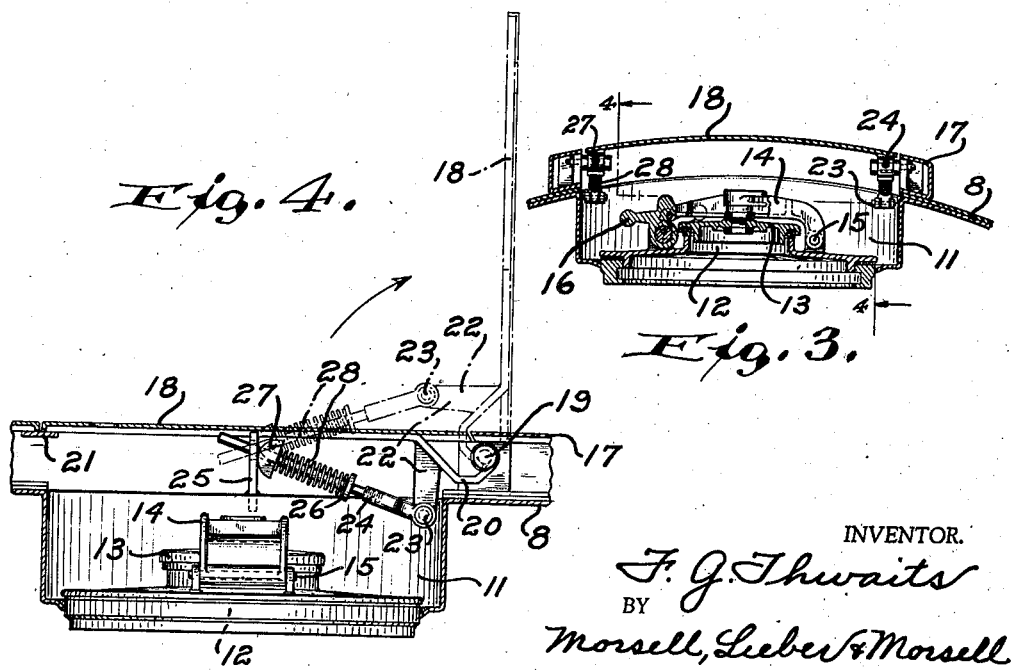
INVENTOR.
F. G. Thwaits
BY
Morsell, Lieber & Morsell
ATTORNEYS.

Patented Jan. 19, 1937

2,067,994

UNITED STATES PATENT OFFICE 2,067,994

TANK STRUCTURE

Frederick G. Thwaits, Wauwatosa, Wis., assignor to The Heil Co., Milwaukee, Wis., a corporation of Wisconsin Application May 31, 1934, Serial No. 728,350

6 Claims. (Cl. 220—32)

The present invention relates to improvements in the construction of fluid storage and transporting receptacles associated with cartage vehicles.

Generally defined, an object of the invention is to provide an improved vehicle tank structure which offers minimum obstruction to the progress of the vehicle, and the interior of which is conveniently accessible.

It has heretofore been proposed, as shown and described in copending application Serial No. 699,662, filed November 25, 1933, to obviate objectionable outward projection of the manholes and closures in vehicle tank structures by disposing each manhole structure in a recess at the top of the tank and by placing a concealing walk with readily removable cover sections over the top of the series of recesses. The walk of this prior tank structure extends longitudinally of the vehicle in order to minimize wind resistance, and the cover sections thereof swing about pivots located at opposite sides of the walk, each of these sections comprising two oppositely swingable cover portions. While this prior manhole and walk assemblage is relatively satisfactory, it is also quite complicated and the manhole closures are not as conveniently accessible for manipulation as might be desired.

The present invention therefore contemplates provision of an improved concealing walk structure for tanks having one or more manhole and closures therefor at the top, whereby the manhole closures are made more readily accessible and manipulable.

In accordance with the improvement, the cover sections of the walk are caused to swing about pivots extending transversely of the direction of extent of the walk as a whole; and these pivoted cover sections may each be formed of a single piece properly supported to resist inward distortion thereof.

A clear conception of one embodiment of the present invention, and of the mode of constructing and of manipulating manhole closures and the improved concealing covers therefor, may be had by referring to the drawing accompanying and forming a part of this specification, in which like reference characters designate the same or similar parts in the various views.

Fig. 1 is a side elevation of a motor-propelled tank truck having streamline contour;

Fig. 2 is an enlarged top view of a fragment of the tank structure of the vehicle shown in Fig. 1;

Fig. 3 is a further enlarged transverse section thru one of the manholes of the tank, the section being taken along the line 3—3 of Fig. 2; and Fig. 4 is a still further enlarged longitudinal section thru the manhole portion of the tank, taken along the line 4—4 of Fig. 3.

Altho the invention has been specifically disclosed herein as being applied to a tank truck especially adapted for the storage and transportation of liquid such as oil, it is not intended to unnecessarily limit the scope by such specific disclosure.

In Fig. 1 of the drawing, the streamlined, motor-driven vehicle comprises a chassis 5 mounted upon wheels 6, some or all of which may be driven by an engine located near the cab 7 at the front portion of the chassis 5. The receptacle or tank 8, which is of the multiple compartment type, is carried by the chassis 5 rearwardly of the driver's cab 7 and is ordinarily of elliptical, transverse cross-section. The several compartments of the tank 8 are provided with the usual fluid dispensing conduits at the lower portions thereof, these conduits being accessible either thru a rear housing 9 or thru side housings 10 for the purpose of effecting withdrawal of liquid from the tank 8.

The upper portion of the tank 8, adjacent to the top of each of the individual tank compartments, is provided with a recess 11 within which is located a manhole 12 and a removable closure 13 therefor. The several recesses 11 may be formed either as shown herein or as a continuous trough extending thruout the length of the top of the tank, as shown in my copending application hereinabove referred to; and the individual manhole closures 13 are carried by levers 14 swingable about pivots 15 and adapted to be locked in closed position by latches 16. These pivots 15 are disposed longitudinally of the tank 8, and when the manhole closures 13 are in closed position, the levers 14 are located within the recesses 11 and below the top of the tank.

A walk 17 is provided along the top of the tank 8, and this walk 17 comprises removable cover sections 18 located one above each of the recesses 11. Each of the cover sections 18 is formed as shown in Figs. 2–4 inclusive, and is swingable about horizontal pivots 19 mounted upon the tank 8 and coacting with bent side brackets 20 secured to the cover section 18. The pivots 19 extend transversely of the walk 17, and the cover sections 18, when closed, are adapted to coact with stop plates 21, as shown in Fig. 4, which hold them in alinement with the fixed sections of the walk. The brackets 20 are provided with ears 22 which are attached by means of pivot pins 23 to the swinging ends of the toggle rods 24, and the opposite ends of these rods 24 are slidable thru elliptical openings in guides 25 which are fixedly attached to the top of the tank 8. There are two of these rods 24 cooperable with each cover section 18, and each rod 24 has a collar 26 fixed to the medial portion thereof and a semi-cylindrical block 27 slidably embracing the same and coacting with the corresponding guide 25. A compression spring 28 embraces each rod 24 and coacts with the adjacent collar 26 and block 27, and these springs 28 function to keep the cover sections 18 in both open and closed position, as clearly shown in Fig. 4.

During normal use of the improved tank truck and while the motor vehicle is being propelled along the ground, the removable covers 18 of the walk 17 are closed; and the structure appears as shown in Fig. 1. The vehicle may then be transported from place to place with minimum obstruction to the progress thereof, in view of the fact that the walk 17 extends longitudinally of the tank and in the normal direction of travel of the vehicle. The several compartments of the tank 8 may be filled with suitable grades of liquid thru their respective manhole openings 12 by merely lifting the cover sections 18 of the walk 17. This walk 17 permits convenient access to the cover sections 18, and the walk may, if desired, be provided with side rails and with an end ladder, in an obvious manner.

When a cover section 18 of the walk is closed, as shown in full lines in Figs. 3 and 4, the manhole closure 13 is also closed and is locked in sealed condition by the lever 14 and latch 16 thereof. The spring 28 then functions to press against the collars 26 and the blocks 27 to hold the cover 18 against the stop plate 21. As the cover 18 is swung about its pivots 19 during opening thereof, the springs 28 are initially compressed until the pins 23, connecting the rods 24 with the ears 22, are swung past the position of alinement of the rods and ears, whereupon the springs 24 again expand to force the cover section 18 into substantially vertical position, as shown in dot-and-dash lines in Fig. 4. The end of the cover section nearest its pivots 19 will then coact with the adjacent fixed portion of the walk 17, and the springs 28 will hold the cover section 18 in such open position. It will therefore be apparent that the rods 24 and ears 22 provide a toggle for holding the cover section 18 either in closed or open position, the springs 28 serving to actuate these toggles.

By mounting the cover sections 18 for swinging movement longitudinally of the tank 8, a single cover section 18 may be utilized as a closure for each recess 11; and the manhole closures 13 are more readily accessible than when several cover sections are utilized to conceal each manhole closing mechanism. The cover sections 18 are, moreover, curved transversely of the vehicle and cooperate with the stop plates 21 so as to resist inward distortion or bending of these cover sections. The use of a single set of toggle mechanisms for each cover section 18 also simplifies the mechanism, and the bent portions of the brackets 20 provide for proper clearance between these brackets and the adjacent fixed portions of the walk 17. The cover sections 18 may be readily manipulated to open and close the same by merely inserting a hook in the opening provided near the swinging end of each cover section, and the manhole closures illustrated are of relatively standard construction.

It should be understood that it is not desired to limit the present invention to the exact details of construction and to the precise mode of operation herein shown and described, for various modifications within the scope of the claims may occur to persons skilled in the art.

It is claimed and desired to secure by Letters Patent:

1. In combination, a tank having an upper opening, a closure for said opening pivotally supported to swing transversely of said tank, and an upwardly curved walk extending along the top of said tank and having an upwardly curved pivoted section disposed above said closure, said pivoted section being mounted to swing longitudinally of said tank and having one end curved to coact with a substantial portion of the upwardly curved adjacent part of the walk when said pivoted section is swung open.

2. In combination, a tank having an upper opening, a closure for said opening, and an upwardly curved walk extending along the top of said tank and having a pivoted section disposed over said closure, said pivoted section being mounted to swing longitudinally of said tank and having its pivot end curved to conform and coact with a substantial portion of the upwardly curved adjacent part of the walk when said pivoted section is swung open.

3. In combination, a tank having an upper opening, and an upwardly curved walk extending along the top of said tank and having an upwardly curved pivoted section disposed above said opening, said pivoted section being mounted to swing longitudinally of said tank and having one end curved to contact along substantially its entire end edge with the upwardly curved adjacent upper surface of the walk when said pivoted section is swung open.

4. In combination, a tank having an upper opening, and a laterally curved walk extending along the top of said tank and having a similarly laterally curved pivoted section disposed above said opening, said pivoted section being mounted to swing about an axis extending across said tank and having one end curved to contact along substantially its entire end edge with the laterally curved adjacent upper surface of the walk when said pivoted section is swung to fully opened position.

5. In combination, a tank having an upper opening, and a walk having a curved upper surface extending along the top of said tank and having a pivoted section disposed above said opening, said pivoted section being mounted to swing longitudinally of the walk and having the end thereof nearest its pivot curved to coact with the curved upper walk surface throughout substantially the entire width of the latter when said pivoted section is swung to fully opened position.

6. In combination, a tank having an upper opening, and a walk having a laterally curved upper surface extending along the top of said tank and having a pivoted closure section mounted to swing longitudinally of the walk and over said opening, said section having its pivoted end curved to contact substantially its entire end edge with said curved upper walk surface when said section is fully opened and having its opposite end positively positioned in alinement with the adjacent walk portion when closed.

F. G. THWAITS.